United States Patent
Anand et al.

(10) Patent No.: US 10,691,304 B1
(45) Date of Patent: Jun. 23, 2020

(54) DATA PREPARATION USER INTERFACE WITH CONGLOMERATE HETEROGENEOUS PROCESS FLOW ELEMENTS

(71) Applicant: Tableau Software, Inc., Seattle, WA (US)

(72) Inventors: Anushka Anand, Seattle, WA (US); Arthur Gyldenege, Seattle, WA (US); Brice Johnson, Redmond, WA (US)

(73) Assignee: Tableau Software, Inc., Seattle, WA (US)

( * ) Notice: Subject to any disclaimer, the term of this patent is extended or adjusted under 35 U.S.C. 154(b) by 33 days.

(21) Appl. No.: 16/167,313

(22) Filed: Oct. 22, 2018

(51) Int. Cl.
*G06F 3/0482* (2013.01)
*G06F 3/0484* (2013.01)

(52) U.S. Cl.
CPC .......... *G06F 3/0482* (2013.01); *G06F 3/0484* (2013.01)

(58) Field of Classification Search
CPC .............................. G06F 3/0482; G06F 3/0484
See application file for complete search history.

(56) References Cited

U.S. PATENT DOCUMENTS

| | | | | |
|---|---|---|---|---|
| 5,999,192 A * | 12/1999 | Selfridge | ................ | G06F 16/26 345/440 |
| 6,278,452 B1 * | 8/2001 | Huberman | ............ | G06F 16/168 715/764 |
| 8,806,377 B2 * | 8/2014 | Chen | .................... | G06F 3/0482 715/841 |
| 8,863,029 B2 * | 10/2014 | Chen | .................. | G06F 16/2428 715/810 |
| 9,465,523 B2 * | 10/2016 | Kleser | .................. | G06F 3/0484 |
| 10,242,079 B2 * | 3/2019 | Kim | .................... | G06F 16/2455 |
| 10,528,587 B2 * | 1/2020 | Kim | .................... | G06F 16/2455 |
| 2003/0182582 A1 * | 9/2003 | Park | .................... | H04L 63/1433 726/25 |
| 2004/0078105 A1 * | 4/2004 | Moon | .................... | G06Q 10/10 700/100 |
| 2005/0022129 A1 * | 1/2005 | Borenstein | ............. | G06F 9/451 715/734 |
| 2005/0044525 A1 * | 2/2005 | Lazarov | ................ | G06N 5/003 717/104 |
| 2007/0016615 A1 * | 1/2007 | Mohan | ..................... | G06F 8/20 |

(Continued)

*Primary Examiner* — Shourjo Dasgupta
(74) *Attorney, Agent, or Firm* — Morgan, Lewis & Bockius LLP

(57) ABSTRACT

A method prepares data for analysis. The method displays a user interface, which includes multiple panes, including a data flow pane. The data flow pane includes a flow diagram having multiple nodes, each specifying a primary operation and/or multiple secondary operations. Each primary operation retrieves data from a data source, transforms data, or builds an output data set. When a user selects a node, the user interface displays a change list pane, which is an ordered list of secondary operations performed at the node. When the user provides input to perform a secondary operation at the selected node, the user interface (i) performs the secondary operation, (ii) updates the selected node with an indicator that the node includes secondary operations, (iii) determines a logical ordering for the secondary operation based on the primary operation, and (iv) adds the secondary operation to the change list pane according to the logical ordering.

20 Claims, 13 Drawing Sheets

(56) References Cited

U.S. PATENT DOCUMENTS

| | | | |
|---|---|---|---|
| 2009/0064053 A1* | 3/2009 | Crawford | G06F 3/04845 |
| | | | 715/854 |
| 2009/0100086 A1* | 4/2009 | Dumant | G06T 11/206 |
| 2014/0250153 A1* | 9/2014 | Nixon | G05B 19/042 |
| | | | 707/812 |
| 2015/0278258 A1* | 10/2015 | Kienzle | G06F 3/0484 |
| | | | 707/692 |
| 2016/0260063 A1* | 9/2016 | Harris | G06F 16/282 |
| 2017/0069118 A1* | 3/2017 | Stewart | G06F 3/04845 |
| 2018/0129719 A1* | 5/2018 | Kim | G06F 16/258 |
| 2018/0165297 A1* | 6/2018 | Kuchoor | G06F 16/178 |
| 2018/0367371 A1* | 12/2018 | Nagarajan | H04L 43/0811 |
| 2019/0121807 A1* | 4/2019 | Boutros | G06F 16/2428 |
| 2019/0138675 A1* | 5/2019 | Fontes | G06F 30/23 |
| 2019/0179927 A1* | 6/2019 | Rao | G06F 11/30 |
| 2020/0012656 A1* | 1/2020 | Pugh | G06F 16/9038 |

\* cited by examiner 702　704　706　708　710

|  | Input | Clean | Aggregate | Pivot | Join | Union | Output |
|---|---|---|---|---|---|---|---|
| Filter | x | x | x | x | x | x |  |
| Calculated Field |  | x | x | x | x | x |  |
| Rename Field | x | x | x | x | x | x | x |
| Remove Field | x | x | x | x | x | x | x |
| Edit Value |  | x | x | x | x | x |  |
| Group and Replace |  | x | x | x | x | x |  |
| Split |  | x | x | x | x | x |  |
| Change Datatype | x | x | x | x | x | x |  |

Figure 8

|  | Input | Clean | Aggregate *grouped fields* | Aggregate *aggregated fields* | Pivot *unpivot fields* | Pivot *unpivot fields* | Join | Join | Join | Union | Union *combined fields* | Output |
|---|---|---|---|---|---|---|---|---|---|---|---|---|
| Filter | x | x | Before | After | Before | After | Before | After | Before | After | After |  |
| Calculated Field |  | x | Before | After | Before | After | Before | After | Before | After | After |  |
| Rename Field | x | x | Before | After | Before | After | Before | After | Before | After | After | x |
| Remove Field | x | x | Before | After | Before | After | Before | After | Before | After | After | x |
| Edit Value | x | x | Before | After | Before | After | Before | After | Before | After | After |  |
| Group and Replace |  | x | Before | After | Before | After | Before | After | Before | After | After |  |
| Split |  | x | Before | After | Before | After | Before | After | Before | After | After |  |
| Change Datatype | x | x | Before | After | Before | After | Before | After | Before | After | After |  |

Figure 9

DATA PREPARATION USER INTERFACE WITH CONGLOMERATE HETEROGENEOUS PROCESS FLOW ELEMENTS

TECHNICAL FIELD

The disclosed implementations relate generally to data visualization and more specifically to systems, methods, and user interfaces to prepare and curate data for use by a data visualization application.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, data frequently needs to manipulated or modified to be put it into a format that can be easily used by data visualization applications.

Many types of data manipulation operations are required for users to prepare their data for analysis. In typical data flow applications, each operation is displayed to users as an individual unit, and a user is only permitted to perform a restricted set of operations within each such unit. As more operations are added, flow diagrams become very large an unwieldy, making it difficult for users to understand and/or modify.

SUMMARY

Disclosed implementations have features that provide clarity to users in terms of preparing data. The disclosed data preparation applications provide data flows that permit the addition of minor operations to nodes representing major data manipulation operations. This facilitates any data cleaning and/or curating that may be required for users to take high-level action and appropriately analyze their data. The design of these "super nodes" permits users to perform all types of data manipulations at any point in data analysis, and simplifies data flow diagrams.

In accordance with some implementations, a method prepares data for subsequent analysis. The method is performed at a computer system having a display, one or more processors, and memory storing one or more programs configured for execution by the one or more processors. The method includes displaying a user interface that has a plurality of panes, including a data flow pane. The data flow pane includes a flow diagram having a plurality of nodes. Each node specifies a respective primary operation or specifies a plurality of secondary operations to clean a respective data set. Each primary operation retrieves data from a respective data source, specifies a respective primary operation to transform data, or specifies a respective primary operation to create a respective output data set. The method further includes receiving a first user input to select an existing node from the flow diagram. In response to receiving the first user input, the method displays a change list pane in the plurality of panes. The change list pane displays an ordered list of secondary operations performed at the node. The method further includes receiving a second user input to perform a first secondary operation corresponding to the selected node. In response to receiving the second user input, the method performs the first secondary operation, updates the selected node with an indicator that the node includes one or more secondary operations, determines a respective logical ordering for the first secondary operation based on the primary operation in the selected node, and adds the first secondary operation to the change list pane in accordance with its respective logical ordering In accordance with some implementations, each node has a respective intermediate data set corresponding to each secondary operation stored in the change list pane. In response to receiving a third user input to select a second secondary operation in the ordered plurality of secondary operations in the change list pane, the method displays a sampling of data from the respective intermediate data set that corresponds to the second secondary operation.

In accordance with some implementations, in response to performing the first respective secondary operation, the method displays a sampling of data from the respective intermediate data set in a data pane of the user interface.

In accordance with some implementations, each node has a primary data set computed according to the primary operation. In response to receiving a fourth user input to select the primary operation in the change list pane, the method displays a sampling of data from the primary data set.

In accordance with some implementations, each of the nodes has an untouched input data set corresponding to the data set before the primary operation (or any secondary operation) is performed at the node. In response to receiving a fifth user input to select the untouched input data set in the change list pane, the method displays a sampling of data from the untouched input data set.

In accordance with some implementations, each primary operation is a reshaping operation that is one of aggregate, pivot, join, or union, or is an input or output operation.

In accordance with some implementations, each secondary operation is one of: calculate field, rename field, remove field, edit value, group and replace, split, or change datatype.

In accordance with some implementations, the logical ordering for each secondary operation in the ordered plurality of secondary operations is determined by a chronological order in which each secondary operation is performed.

In some implementations, a non-transitory computer-readable storage medium stores one or more programs configured for execution by a computer system having one or more processors, memory, and a display. The one or more programs include instructions for performing any of the methods described herein.

In some implementations, a computer system has one or more processors, memory, and a display. The memory stores one or more programs configured for execution by the one or more processors and include instructions for performing any of the methods described herein.

Thus, methods, systems, and graphical user interfaces are disclosed that enable users to analyze, prepare, and curate data.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings in which like reference numerals refer to corresponding parts throughout the figures.

FIG. 8 is a tabular representation of the secondary operations that may be performed at super nodes having the indicated primary operations.

FIG. 9 is a tabular representation of the logical ordering of secondary operations relative to the primary operations, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
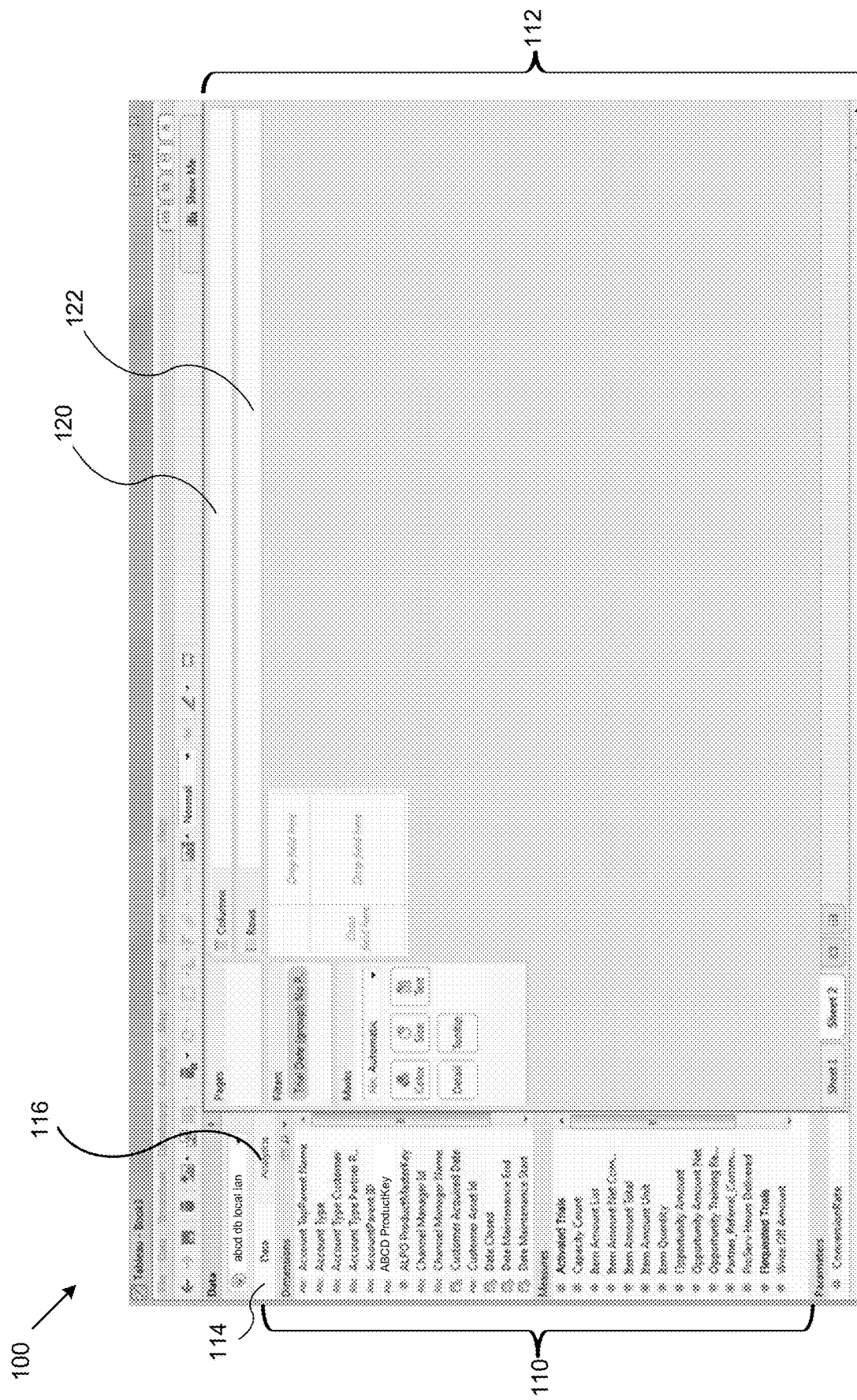
FIG. 1 illustrates a graphical user interface for a data visualization application used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
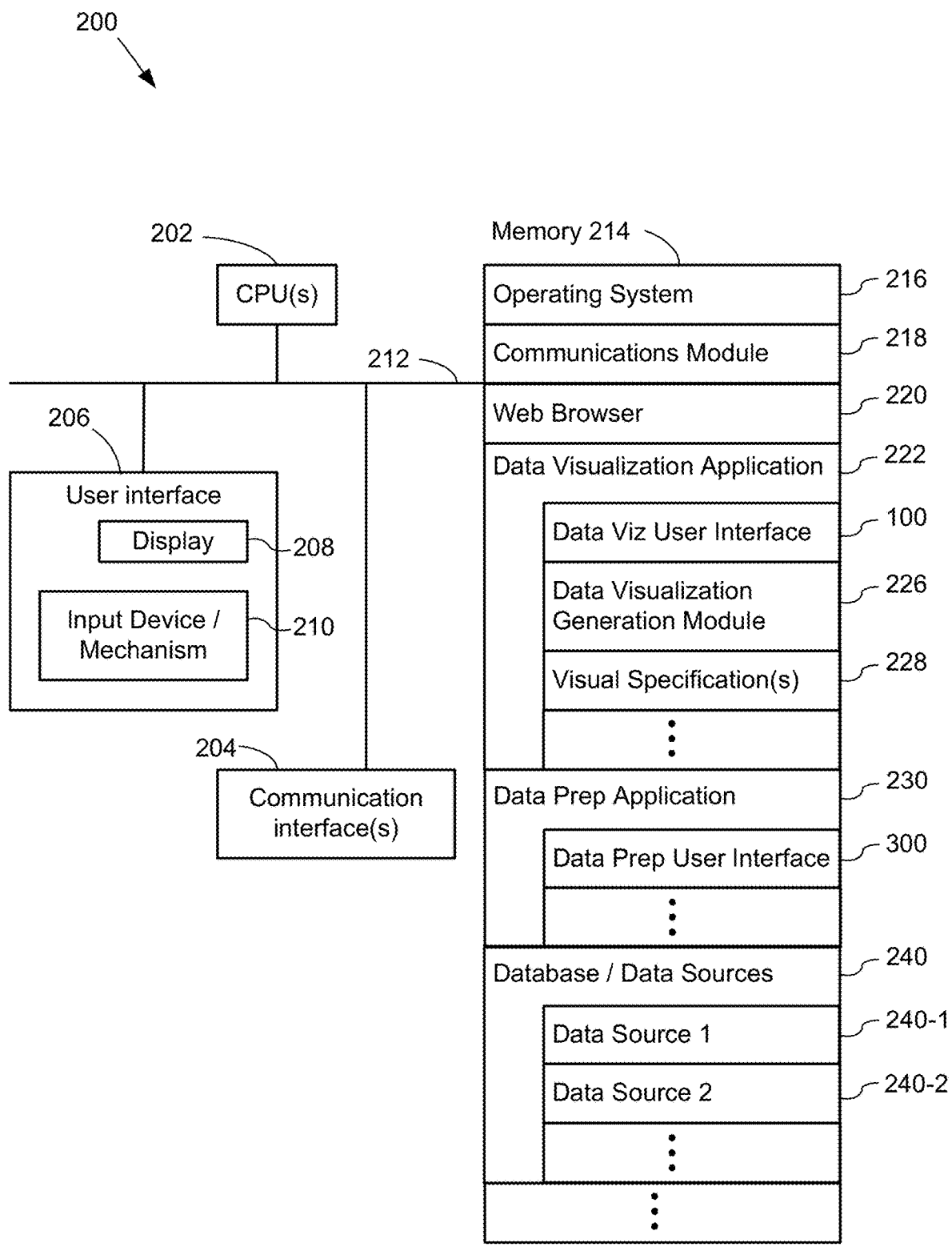
FIG. 2 is a block diagram of a computing device according to some implementations.

FIG. 2 is a block diagram illustrating a computing device 200 that can display the graphical user interface 100 in accordance with some implementations. The computing device can also be used by a data preparation ("data prep") application 230. Various examples of the computing device 200 include a desktop computer, a laptop computer, a tablet computer, and other computing devices that have a display and a processor capable of running a data visualization application 222 and/or a data prep application 230. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprise a non-transitory computer-readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data source(s), and uses the selected fields to define a visual graphic. In some implementations, the information the user provides is stored as a visual specification 228. The data visualization application 222 includes a data visualization generation module

226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server; and zero or more databases or data sources 240 (e.g., a first data source 240-1 and a second data source 240-2), which are used by the data visualization application 222 and/or a data prep application 230. In some implementations, the data sources are stored as spreadsheet files, CSV files, XML files, or flat files, or stored in a relational database.

Figure 3A:
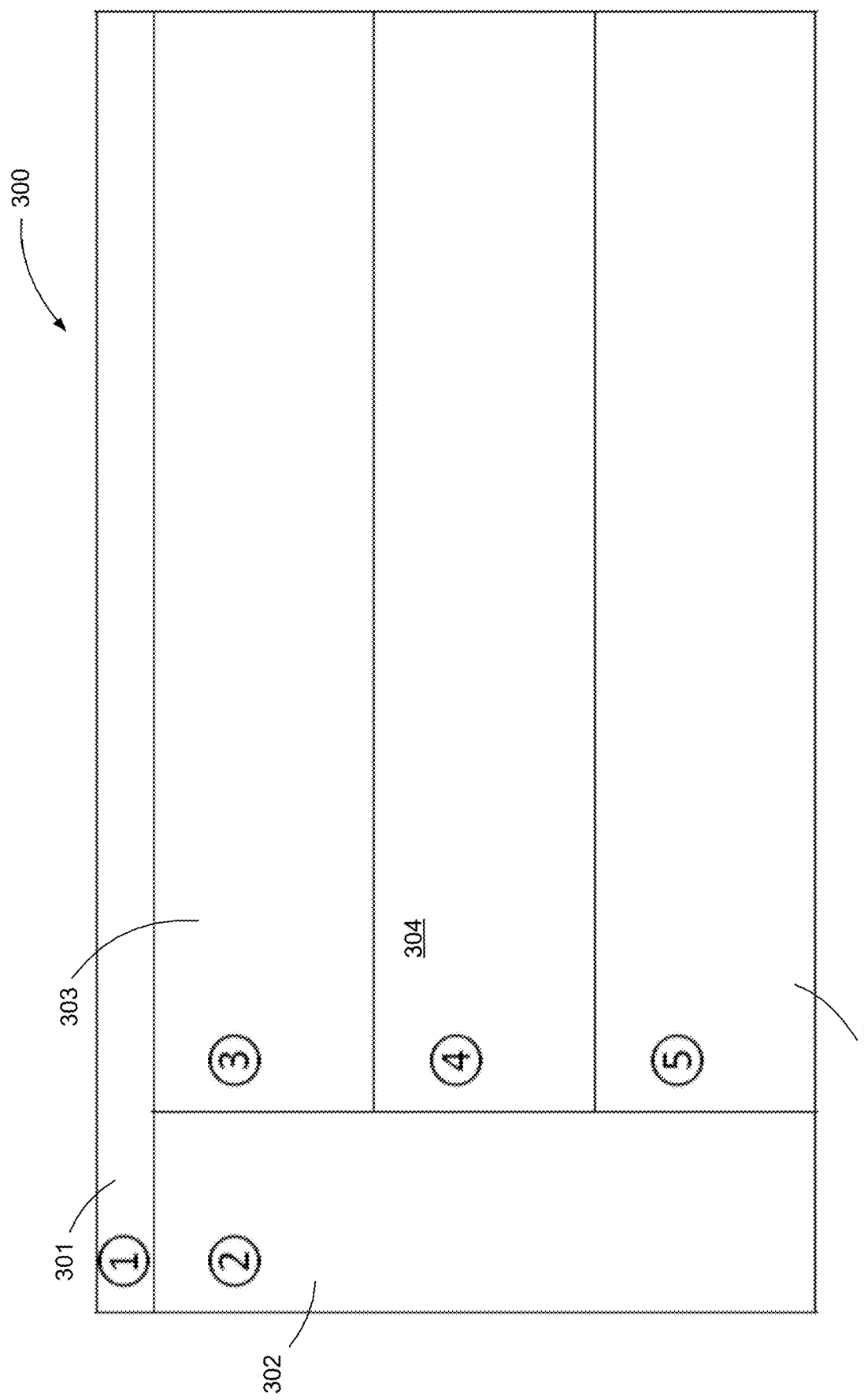
FIGS. 3A and 3B illustrate a graphical user interface for a data preparation application in accordance with some implementations.
Figure 3B:
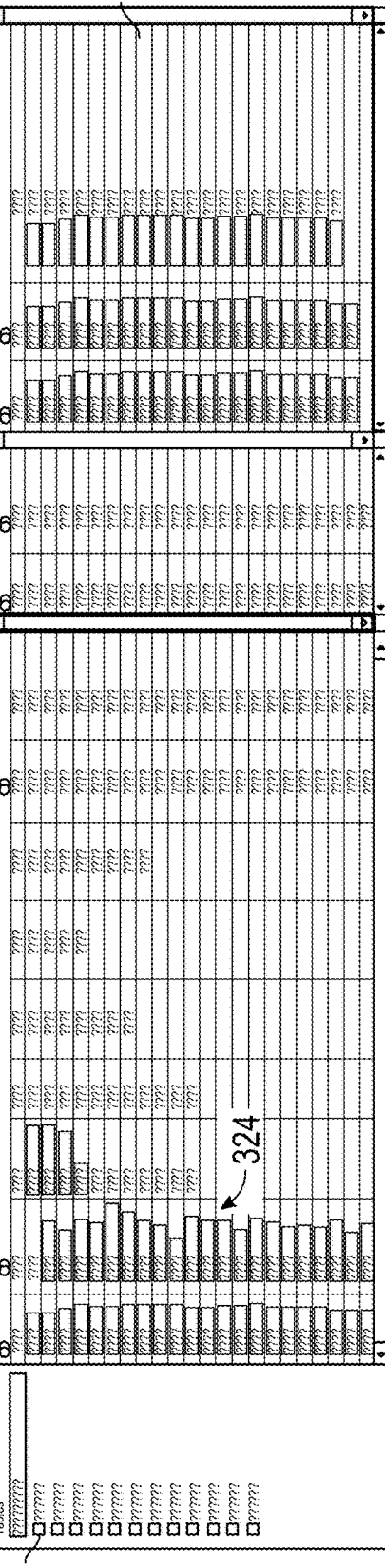

In some instances, the computing device 200 stores a data prep application 230, which has a user interface 300, as shown in FIGS. 3A and 3B. A user uses the data prep application to analyze and massage data for subsequent analysis (e.g., by a data visualization application 222). The data prep application 230 enables user to build flows 323, as described in more detail below.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

FIG. 3A illustrates a user interface for preparing data in accordance with some implementations. In these implementations, there are at least five regions, which have distinct functionality. FIG. 3A shows this conceptually as a menu bar region 301, a left-hand pane 302, a flow pane 303, profile pane 304, and a data pane 305. In some implementations, the profile pane 304 is also referred to as the schema pane. In some implementations, the functionality of the "left-hand pane" 302 is in an alternate location, such as below the menu pane 301 or below the data pane 305.

This interface provides a user with multiple streamlined, coordinated views that help the user to see and understand what they need to do. This novel user interface presents users with multiple views of their flow and their data to help them not only take actions, but also discover what actions they need to take. The flow diagram in the flow pane 303 combines and summarizes actions, making the flow more readable, and is coordinated with views of actual data in the profile pane 304 and the data pane 305. The data pane 305 provides representative samples of data at every point in the logical flow, and the profile pane provides histograms of the domains of the data (e.g., for each data field, the profile pane shows the distribution of data values, typically in "bins").

In some implementations, the left-hand Pane 302 includes a list of recent data source connections as well as a button to connect to a new data source.

In some implementations, the flow pane 303 includes a visual representation (flow diagram or flow) of the flow specification. In some implementations, the flow is a node/link diagram showing the data sources, the operations that are performed, and target outputs of the flow.

Some implementations provide flexible execution of a flow by treating portions of the flow as declarative queries. That is, rather than having a user specify every computational detail, a user specifies the objective (e.g., input and output). The process that executes the flow optimizes plans to choose execution strategies that improve performance. Implementations also allow users to selectively inhibit this behavior to control execution.

In some implementations, the profile pane 304 displays the schema and relevant statistics and/or visualizations for the nodes selected in the flow pane 303. Some implementations support selection of multiple nodes simultaneously, but other implementations support selection of only a single node at a time.

In some implementations, the data pane 305 displays row-level data for the selected nodes in the Flow Pane 303.

In some implementations, a user creates a new flow using a "File→New Flow" option in the Menu Bar. Users can also add data sources to a flow. In some instances, a data source is a relational database. In some instances, one or more data sources are file-based, such as CSV files or spreadsheet files. In some implementations, a user adds a file-based source to the flow using a file connection affordance in the left-hand pane 302. This opens a file dialog that prompts the user to choose a file. In some implementations, the left hand pane 302 also includes a database connection affordance, which enables a user to connect to a database (e.g., an SQL database).

When a user selects a node in the Flow Pane 303, the schema for the result set at the node is displayed in the Profile Pane 304. In some implementations, the profile pane 304 includes statistics or visualizations, such as distributions of data values for the fields (e.g., as histograms or pie charts). In implementations that enable selection of multiple nodes in the flow pane 303, schemas for each of the selected nodes are displayed in the profile pane 304.

In addition, when a node is selected in the Flow Pane 303, the data for the node is displayed in the Data Pane 305. The data pane 305 typically displays the data as rows and columns.

Implementations make it easy to edit the flow using the flow pane 303, the profile pane 304, or the data pane 305. For example, some implementations enable a right click operation on a node/table in any of these three panes and add a new column based on a scalar calculation over existing columns in that table. For example, the scalar operation may be a mathematical operation to compute the sum of three numeric columns, a string operation to concatenate string data from two columns that are character strings, or a conversion operation to convert a character string column into a date column (when a date has been encoded as a character string in the data source).

In some implementations, within the flow pane 303 multiple nodes are displayed, with each node being represented by an icon (e.g. the icons 402-414 in FIG. 4A), which indicates the primary operation performed at that node. When a node is selected by the user (e.g. the selected node 408 in FIG. 4A), that node is highlighted within the data flow pane and the data associated with that node is displayed within the data grid 305.

Different nodes within the flow diagram 323 perform different tasks, and thus the node internal information is different. In addition, some implementations display different information depending on whether or not a node is selected. A flow diagram 323 provides an easy, visual way to understand how the data is getting processed, and keeps the process organized in a way that is logical to a user. Although a user can edit a flow diagram 323 directly in the flow pane 303, changes to the operations are typically done in a more immediate fashion, operating directly on the data or schema in the profile pane 304 or the data pane 305 (e.g., right clicking on the statistics for a data field in the profile pane to add or remove a column from the flow).

Three types of nodes are discussed below: input operations, transform operations, and output operations. Input operations create a logical model from some external source. Examples include an operation that imports a CSV. Transform operations transform a logical model into a new logical model, for example a project operation that adds a column to an existing logical model. Output operations take in a logical model and convert it into some other data store.

Within the flow pane 303, a user can perform various tasks, including:

Change node selection. This drives what data is displayed in the rest of the user interface.

Pin flow operations. This allows a user to specify that some portion of the flow must happen first, and cannot be reordered.

Splitting and Combining operations. Users can easily reorganize operation to match a logical model of what is going on. For example, a user may want to make one node called "Normalize Hospital Codes," which contains many operations and special cases. A user can initially create the individual operations, then coalesce the nodes that represent individual operations into the super node "Normalize Hospital Codes." Conversely, having created a node that contains many individual operations, a user may choose to split out one or more of the operations (e.g., to create a node that can be reused more generally).

Filter for navigation. A user can filter the data that is in the view, which does not add a filter to the flow.

Modify row data. A user can directly modify a row. For example, change a data value for a specific field in a specific row from 3 to 4.

Map one value to another. A user can modify a data value for a specific column, and propagate that change all of the rows that have that value for the specific column. For example, replace "N.Y." with "NY" for an entire column that represents states.

Split columns. For example, if a user sees that dates have been formatted like "14 Nov. 2015", the user can split this field into three separate fields for day, month, and year.

Merge columns. A user can merge two or more columns to create a single combined column.

Clean the data to fix errors, handle missing or duplicate values, reconcile variant values that should be the same, conform values to standards, and so on.

Change a data type. A user may begin a flow, then decide to change a type of one of the columns.

Figure 4A:
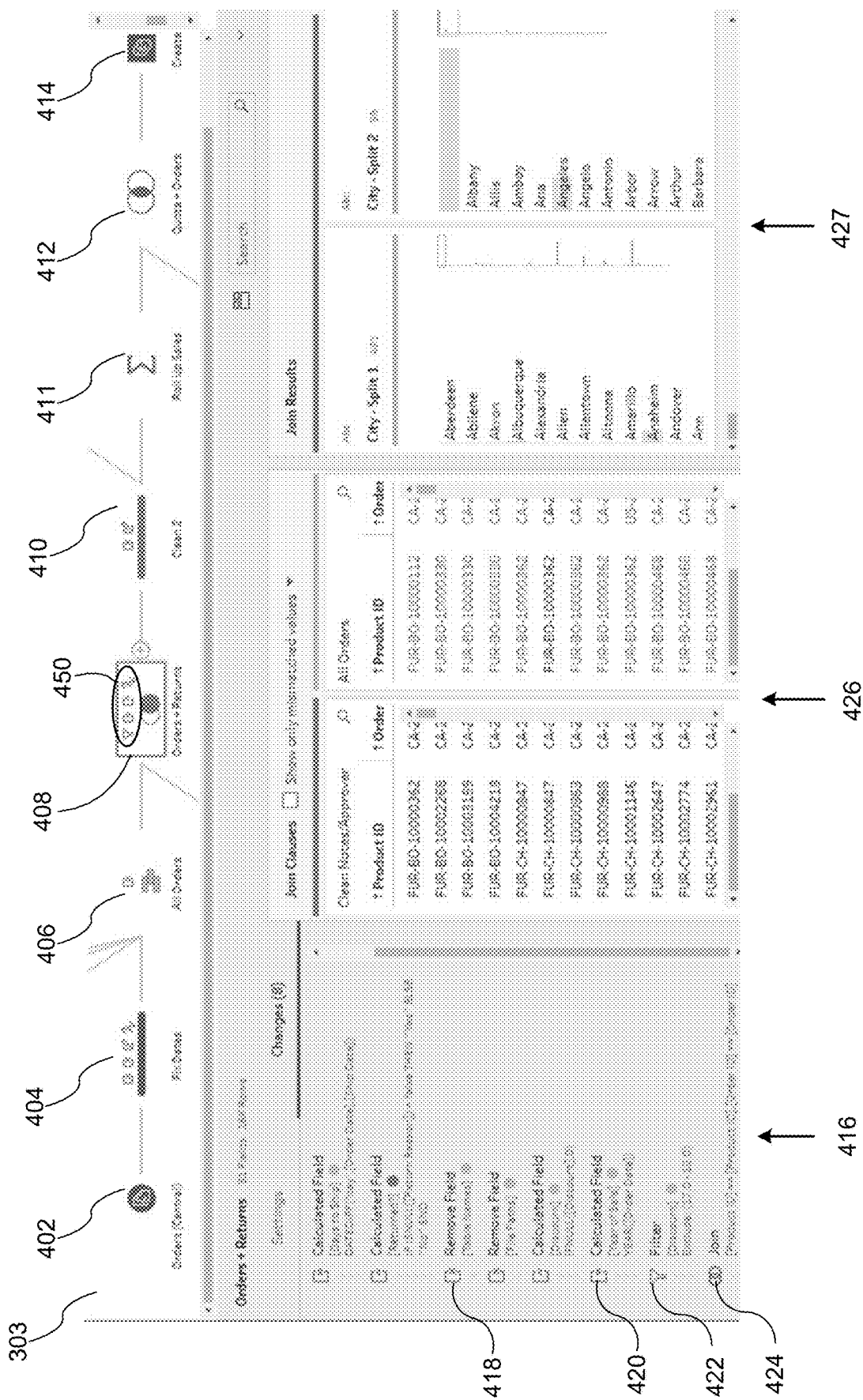
FIGS. 4A, 4B, and 4C illustrate user interfaces where cleaning operations have been performed at a join node, in accordance with some implementations

Rather than displaying a node for every tiny operation, users are able to group operations together into a smaller number of more significant nodes. For example, a join followed by removing two columns can be implemented in one node, instead of in three separate nodes. Or, one or more cleaning operations can be implemented at the node. For example, in FIG. 4A, multiple data values have been removed, calculated, and filtered. FIG. 4A illustrates a join node where a user has performed multiple cleaning (secondary) operations. As displayed in the change list pane 416, multiple secondary operations 418-422 are shown occurring before the primary join operation 424. As shown here, each of the secondary operations is listed before the join operation 424. This is in accordance with the logical ordering matrix 900 illustrated in FIG. 9 and discussed below. The join clauses pane 426 shows the results of the secondary operation before the join event has occurred.

The addition of multiple secondary operations to a node creates a "super node" 408, illustrated by the indicators 450 displayed adjacent to the primary operation icon 408 in the flow pane 303. In some implementations, the list 450 of one or more indicator operations is displayed above the primary operation icon to indicate that the user has performed specific types of cleaning operations in the join super node. The results 427 of the join are also displayed, which shows unmatched rows from both sides of the join. In some implementations, the profile and data panes update based on the selected operation. This allows the user to see the progression of how the operations clean the data in the super node.

Figure 4B:
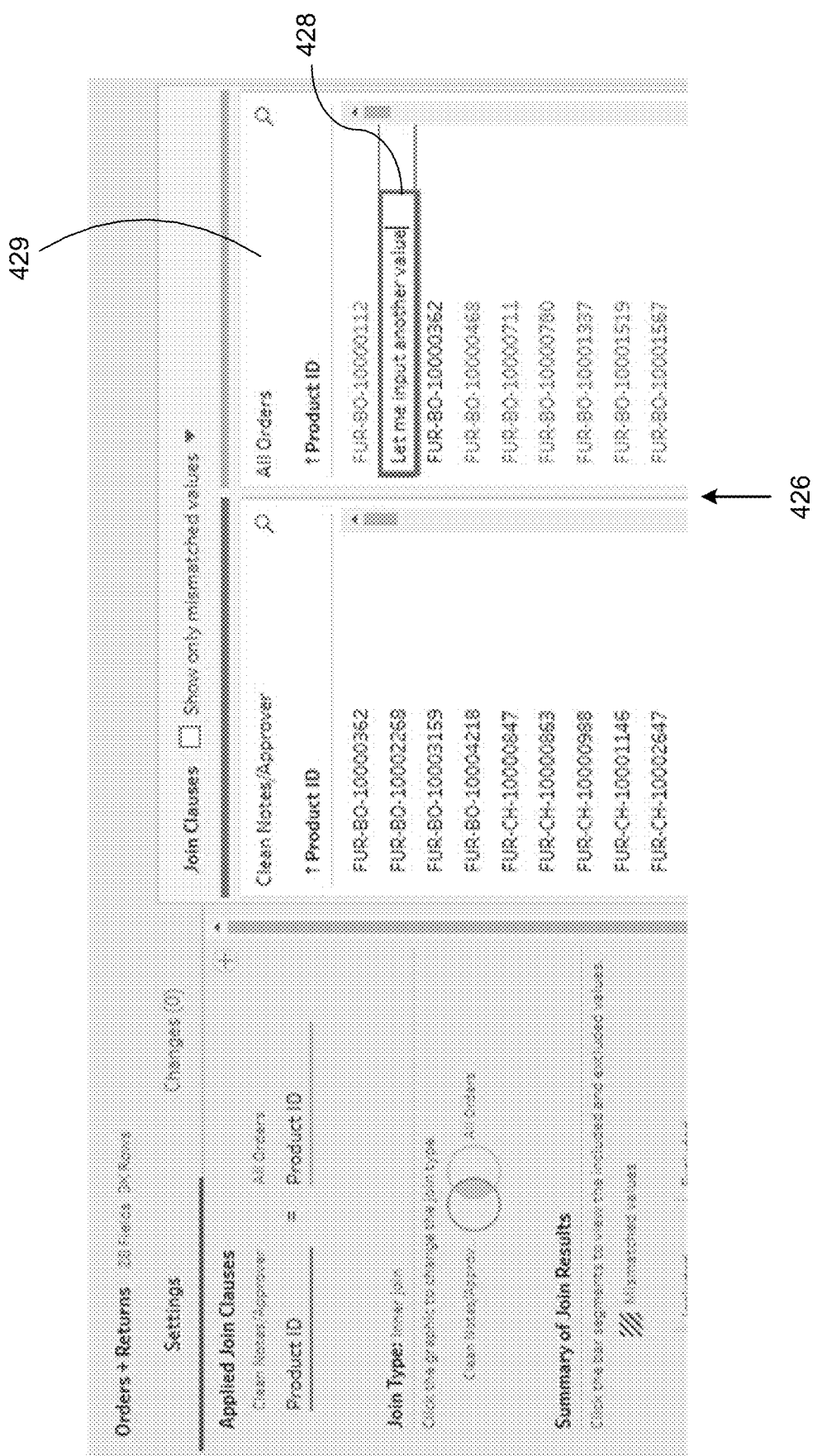

This serves to more clearly organize and group data transformation operations within a super node, and thus enables a user to more easily determine whether more data cleaning needs to be performed. In FIG. 4B, for example, a user has performed an inner join primary operation, and some data values were not included in the final join dataset (e.g. because some values were accidently misspelled). Within the super node, a user can go directly and change the value so it does not fall out of the join. In the "All Orders" panel 429 of the join clauses pane 426, the user interface shows values that were excluded from the inner join. Within the join super node, the user can simply double click on a desired value and change it to another value so that it does not fall out of the final data set (e.g. by changing the data value 428 to 'Fur-Bo-10000362').

Figure 4C:
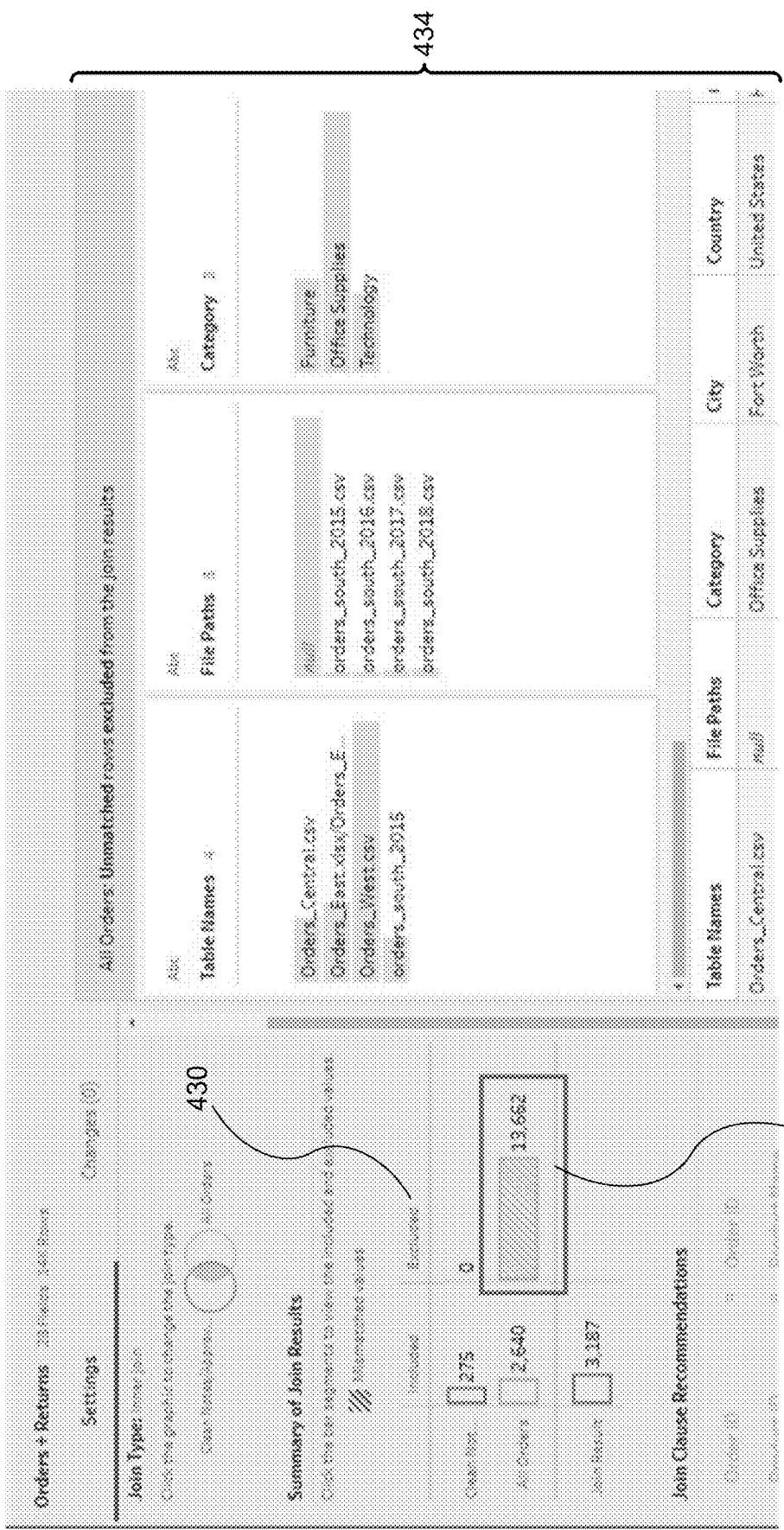

In a super node, it is possible for users to view all of the rows, even those not included in the data set after the primary action was performed. As illustrated in FIG. 4C, a user may select the 'Excluded' bar 430 to view more details on which data values were not included in the final dataset after the primary operation was performed, and a summary of the excluded values 432 is be displayed. If the rows are correctly excluded from the join, then no further cleaning operations are needed. On the other hand, it is easy for the user to review the unmatched rows in the excluded rows window 434 and apply cleaning operations if appropriate.

Figure 5:
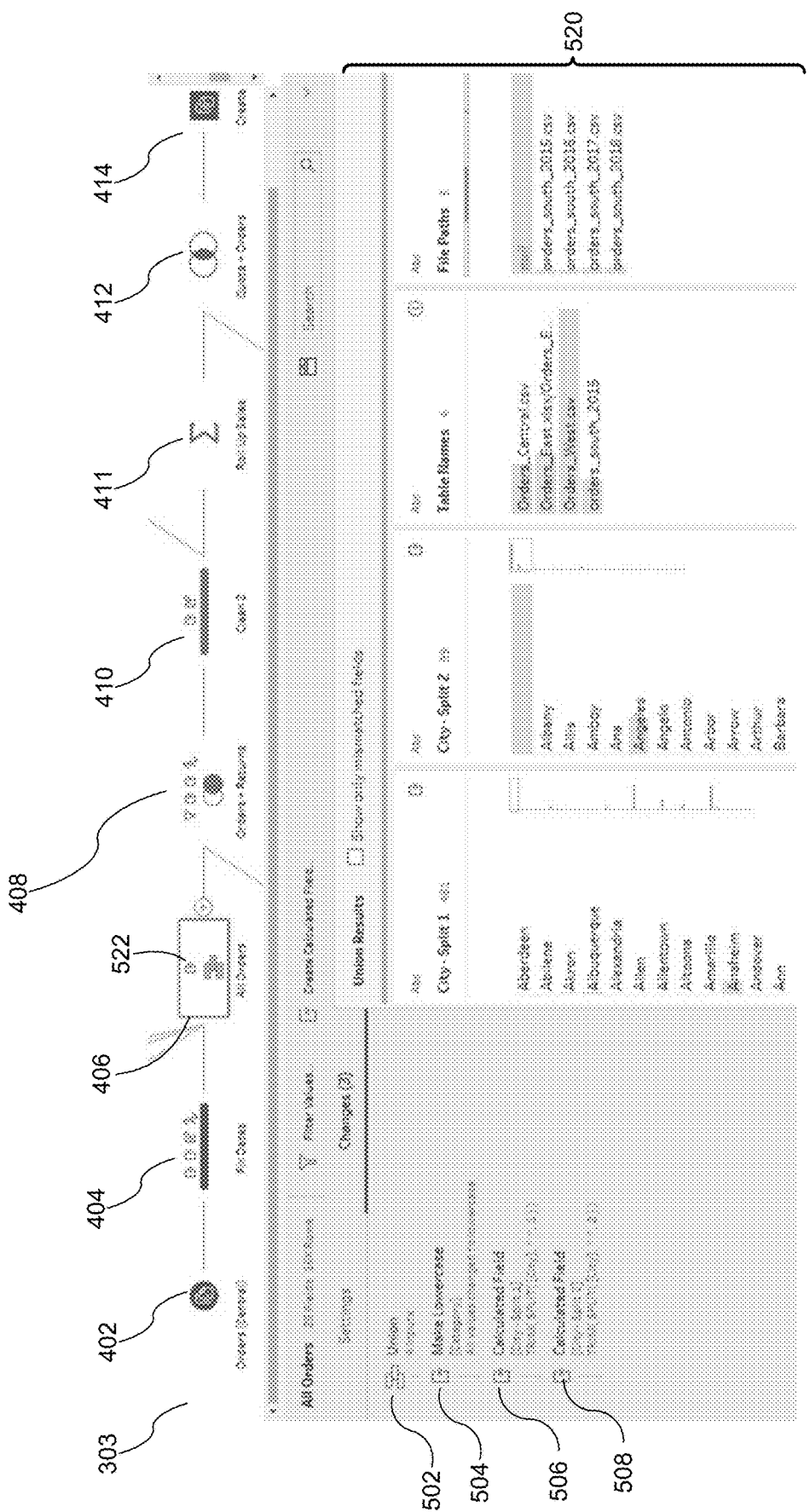
FIG. 5 illustrates a data flow where cleaning operations have been performed at a union node, in accordance with some implementations.

FIG. 5 shows an example of a user performing multiple cleaning operations in a union super node 406. As illustrated in the change pane 416 here, the secondary cleaning operations 504, 506, and 508 are ordered after the union primary action 502, as specified by the chart 900 in FIG. 9. The union results panel 520 enables a user to see if there are any errors in the union. There is a single indicator 522 adjacent to the union icon 406, indicating the presence of certain cleaning operations.

Figure 6:
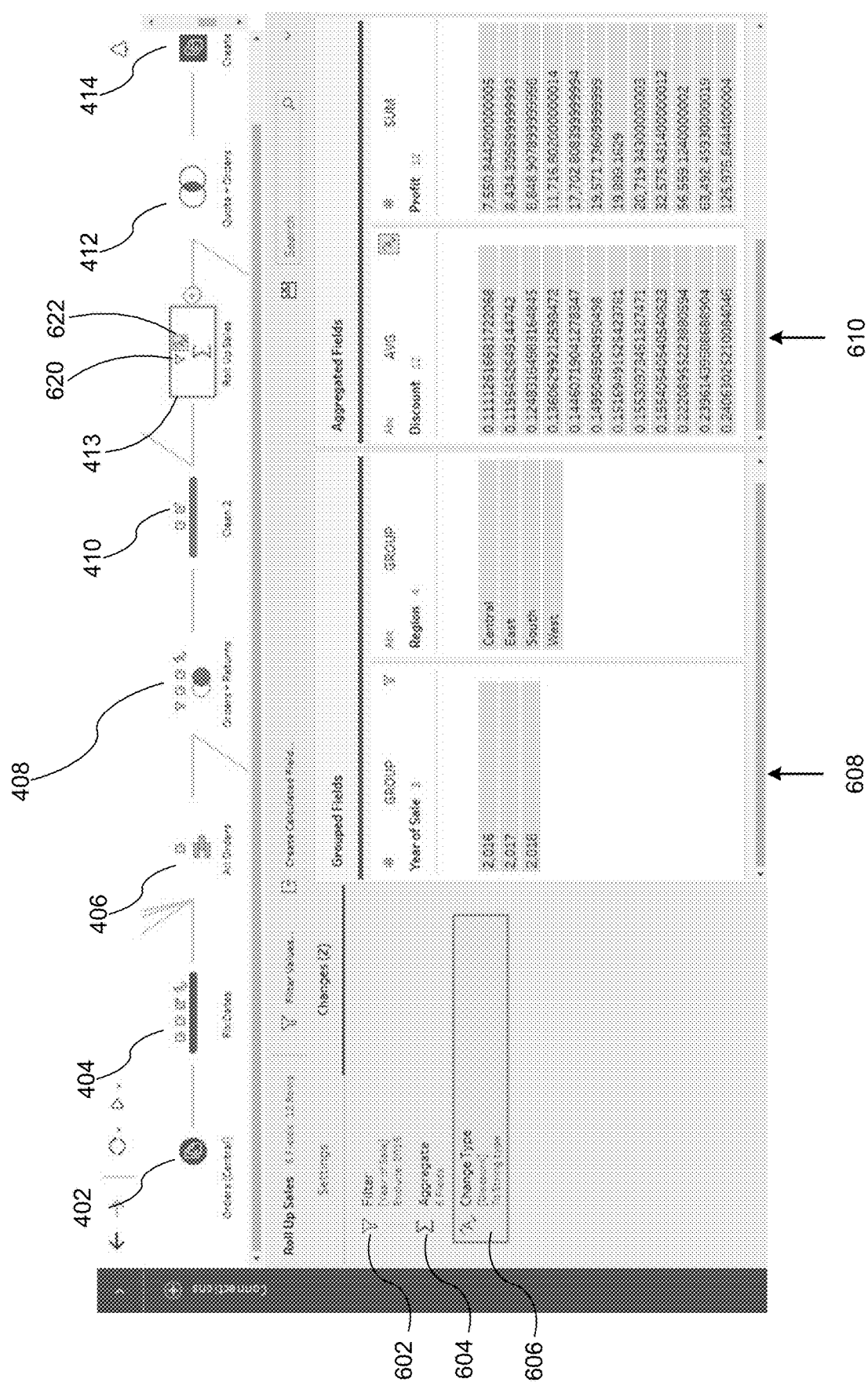
FIG. 6 illustrates a data flow where cleaning operations have been performed at an aggregate node, in accordance with some implementations

FIG. 6 shows an example of a user performing multiple cleaning operations at an aggregate super node 413. As illustrated above in FIGS. 4A and 5, super nodes in the flow pane have indicators arranged above the main icon to indicate that cleaning functions have been performed in addition to a primary operation. The filtering secondary operation 602, which excludes any rows where the data value in the 'Year of Sale' column 608 is "2016," is ordered before the aggregate primary operation 604. The filter indicator 620 is shown adjacent to the main aggregate icon 413. The secondary operation 606, which changes the data type of the 'Discount' column 610, is ordered after the aggregate primary operation 604. The second indicator 622 denotes this change to the data type. The predefined logical ordering method shown in FIG. 9 has been applied because "Year of Sale" is a grouped field, whereas "Discount" is an aggregated field.

Figure 7:
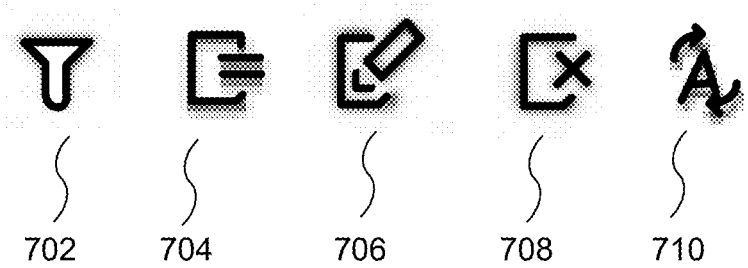
FIG. 7 illustrates cleaning indicators, in accordance with some implementations.

FIG. 7 shows five different secondary operation indicators, which are used to let users know what types of operations are being performed. The filter indicator 702 indicates that at least one filtering operation occurs at the node. The calculation indicator 704 indicates that one or more calculations occur at the node (e.g., to compute a new data field based on the values in other data fields). The edit indicator 706 specifies that one of more data values are being modified. The field removal indicator 708 specifies that one or more data fields are being removed from the data set at the node. The change data type indicator 710 specifies that the data type of a data field is being changed at the node (e.g., converting from a string data type to a numeric data type, or vice versa).

As shown in FIG. 8, in some implementations different sets of secondary operation 804 are allowed for each primary operation 802. In FIG. 8, each 'x' 806 indicates that a specific secondary operation 804 may be performed at a super node that has a specific primary operation 802. The input and output nodes only permit subsets of secondary operations to be performed.

The visual order of the operations in the change list 416 specifies the order in which the operations are performed at the node. In addition to secondary operations, the "change" list also includes the primary operation at the node, so users can easily see the relationship between the secondary operations and the primary operation.

FIG. 9 illustrates the types of primary operations 902 and the predetermined logical ordering 904 (e.g., 'Before' or 'After') of the multiple secondary operations 804 for each case. For example, secondary operations affecting 'Join Results' may only occur after a join operation is performed. Secondary operation affecting data values in the 'Join Clause' or which are excluded from the join must occur before a join operation is performed. The ordering of secondary operations is dependent on which primary operation is performed at each super node. For example, in some implementations, all secondary operations performed in union super nodes are ordered after the union primary operation. In order for users to see all data values before and after the reshaping event of the primary operation (e.g., to edit values either before or after a pivot action), the change list provides an option to navigate to the untouched dataset (i.e., before any operations at the node are performed). Similarly, the change list provides an option to navigate to any point in the sequence of operations.

In some implementations, administrative users may modify the logical ordering matrix 900 to suit their specific needs, but this is uncommon because the matrix 900 has been constructed based on substantial usage. Users can alter the sequence of secondary operations after the default ordering has been applied. When a user selects a particular secondary cleaning operation in a change list for a super node, the user interface displays an intermediate data set corresponding to the operation, and then the user can perform an additional cleaning operation. The additional cleaning operation is added to the change list after the current operation. In some implementations, when the entire node is selected, the additional operation is added at the end of the "before list" or "after list" in accordance with the lookup matrix 900.

Figure 10:
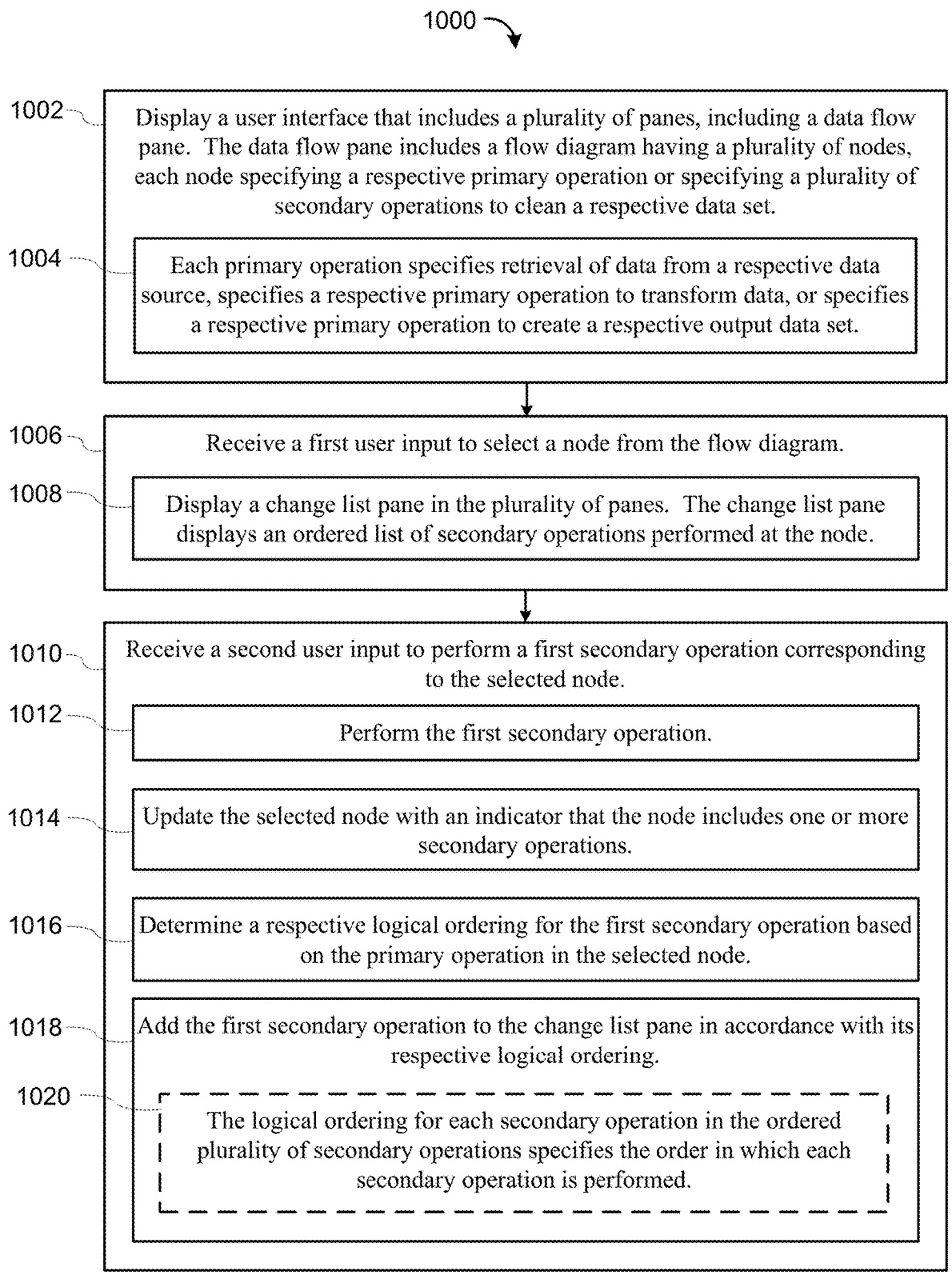
FIG. 10 is a flowchart for a method of enabling users to perform data manipulation operations at every node of a data flow in accordance with some implementations.

FIG. 10 provides a flowchart 1000 of a process of using an interactive method to dynamically prepare a data set in accordance with some implementations. The method is typically performed at a computer 200 having a display 208, one or more processors 202, and memory 214 storing one or more programs configured for execution by the one or more processors.

The method 1000 displays (1002) a user interface that includes a plurality of panes, including a data flow pane 303. The data flow pane includes (1002) a flow diagram having a plurality of nodes. Each node specifies (1002) a respective primary operation (e.g., operations 402-414) or specifies a plurality of secondary operations to clean a respective data set. Each primary operation specifies (1004) retrieval of data from a respective data source, specifies (1004) a respective primary operation to transform data, or specifies (1004) a respective primary operation to create a respective output data set.

The method receives (1006) a first user input to select a node from the flow diagram (e.g., the selected node 408 in FIG. 4A). In response to receiving the first input, the method displays 1008 a change list pane 416 in the plurality of panes. The change list pane displays (1008) an ordered list of secondary operations performed at the node, in the order that the operations are performed.

The method receives (1010) a second user input to perform a first secondary operation corresponding to the selected node. In response to receiving the second user input, the method performs (1012) the first secondary operation (e.g., the editing operation 428 illustrated in FIG. 4B). The method updates (1014) the selected node with an indicator that the node includes one or more secondary operations (e.g., one of the indicators shown in FIG. 7). The method determines (1016) a respective logical ordering for the first secondary operation based on the primary operation in the selected node (e.g., by performing a lookup in the lookup matrix 900 in FIG. 9). The method then adds (1018) the first secondary operation to the change list pane in accordance with its respective logical ordering (e.g., the secondary operations as listed in the change lists 416 in FIGS. 4A, 5, and 6). The sequence matrix 900 in FIG. 9 specifies whether the operation is before the primary operation (on the "before list") or after the primary operation (on the "after list"). Within the appropriate list, the new operation usually goes at the end unless there are dependencies between the cleaning operations. The user is able to move the new operation within the appropriate list within the constraints imposed by dependencies.

Disclosed data prep systems 230 give control to users. In many cases, the data prep application 230 makes intelligent choices for the user, but the user is always able to assert control. Control often has two different facets: control over the logical ordering of operations, which is used to ensure the results are correct and match the user's desired semantics; and physical control, which is mostly used to ensure performance.

The disclosed data prep application 230 also provides freedom. Users can assemble and reassemble their data production components however they wish in order to achieve the shape of data they need.

The disclosed data prep application 230 provides incremental interaction and immediate feedback. When a user takes actions, the system provides feedback through immediate results on samples of the user's data, as well as through visual feedback.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for preparing data for subsequent analysis, comprising:
    at a computer system having one or more processors and memory storing one or more programs configured for execution by the one or more processors:
        displaying a user interface that includes a plurality of panes, including a data flow pane, wherein the data flow pane includes a flow diagram having a plurality of nodes, each node specifying a respective primary operation or specifying a plurality of secondary operations to clean a respective data set, and wherein each primary operation specifies retrieval of data from a respective data source, specifies a respective primary operation to transform data, or specifies a respective primary operation to create a respective output data set;
        receiving a first user input to select a node from the flow diagram;
        in response to receiving the first user input:
            displaying a change list pane in the plurality of panes, wherein the change list pane displays an ordered list of secondary operations performed at the node;
        receiving a second user input to perform a first secondary operation corresponding to the selected node; and
        in response to receiving the second user input:
            performing the first secondary operation;
            updating the selected node with an indicator that the node includes one or more secondary operations;
            determining a respective logical ordering for the first secondary operation based on the primary operation in the selected node; and
            adding the first secondary operation to the change list pane in accordance with its respective logical ordering.

2. The method of claim 1, wherein each node has a respective intermediate data set corresponding to each secondary operation shown in the change list pane and the method further comprises:
    in response to receiving a third user input to select a second secondary operation in the ordered plurality of secondary operations in the change list pane, displaying a sampling of data from the respective intermediate data set that corresponds to the second secondary operation.

3. The method of claim 2, further comprising:
    in response to performing the first secondary operation, displaying a sampling of data from the respective intermediate data set, corresponding to the first secondary operation, in a data pane of the user interface.

4. The method of claim 2, wherein the logical ordering for each secondary operation in the ordered plurality of secondary operations is determined by a chronological order in which each secondary operation is performed.

5. The method of claim 1, wherein each node has a primary data set computed according to the primary operation and the method further comprises:
    in response to receiving a fourth user input to select the primary operation in the change list pane, displaying a sampling of data from the primary data set.

6. The method of claim 1, wherein each of the nodes has an untouched input data set corresponding to the data set before the primary operation or any secondary operation at the node is performed and the method further comprises:
    in response to receiving a fifth user input to select the untouched input data set in the change list pane, displaying a sampling of data from the untouched input data set.

7. The method of claim 1, wherein each primary operation comprises a reshaping operation that is one of aggregate, pivot, join, or union, or comprises an input or output operation.

8. The method of claim 1, wherein each secondary operation is one of: calculate field, rename field, remove field, edit value, group and replace, split, or change datatype.

9. A non-transitory computer-readable storage medium storing one or more programs configured for execution by a computer system having one or more processors, memory, and a display, the one or more programs comprising instructions for:
    displaying a user interface that includes a plurality of panes, including a data flow pane, wherein the data flow pane includes a flow diagram having a plurality of nodes, each node specifying a respective primary operation or specifying a plurality of secondary operations to clean a respective data set, and wherein each primary operation specifies retrieval of data from a respective data source, specifies a respective primary operation to transform data, or specifies a respective primary operation to create a respective output data set;
    receiving a first user input to select a node from the flow diagram;
    in response to receiving the first user input:
        displaying a change list pane in the plurality of panes, wherein the change list pane displays an ordered list of secondary operations performed at the node;
    receiving a second user input to perform a first secondary operation corresponding to the selected node; and
    in response to receiving the second user input:

performing the first secondary operation;
updating the selected node with an indicator that the node includes one or more secondary operations;
determining a respective logical ordering for the first secondary operation based on the primary operation in the selected node; and
adding the first secondary operation to the change list pane in accordance with its respective logical ordering.

10. The computer-readable storage medium of claim 9, wherein each node has a respective intermediate data set corresponding to each secondary operation stored in the change list pane and also has an untouched input data set corresponding to the data set before the any operation is performed at the node.

11. The computer-readable storage medium of claim 9, wherein each primary operation comprises a reshaping operation that is one of: aggregate, pivot, join, or union, or comprises an input or output operation.

12. The computer-readable storage medium of claim 9, wherein each secondary operation is one of: calculate field, rename field, remove field, edit value, group and replace, split, or change datatype.

13. A computer system for preparing data for subsequent analysis, comprising:
one or more processors;
memory; and
one or more programs stored in the memory and configured for execution by the one or more processors, the one or more programs comprising instructions for:
displaying a user interface that includes a plurality of panes, including a data flow pane, wherein the data flow pane includes a flow diagram having a plurality of nodes, each node specifying a respective primary operation or specifying a plurality of secondary operations to clean a respective data set, and wherein each primary operation specifies retrieval of data from a respective data source, specifies a respective primary operation to transform data, or specifies a respective primary operation to create a respective output data set;
receiving a first user input to select a node from the flow diagram;
in response to receiving the first user input:
displaying a change list pane in the plurality of panes, wherein the change list pane displays an ordered list of secondary operations performed at the node;
receiving a second user input to perform a first secondary operation corresponding to the selected node; and
in response to receiving the second user input:
performing the first secondary operation;
updating the selected node with an indicator that the node includes one or more secondary operations;
determining a respective logical ordering for the first secondary operation based on the primary operation in the selected node; and
adding the first secondary operation to the change list pane in accordance with its respective logical ordering.

14. The computer system of claim 13, wherein each node has a respective intermediate data set corresponding to each secondary operation shown in the change list pane and the one or more programs further comprise instructions for:
in response to receiving a third user input to select a second secondary operation in the ordered plurality of secondary operations in the change list pane, displaying a sampling of data from the respective intermediate data set that corresponds to the second secondary operation.

15. The computer system of claim 14, wherein the one or more programs further comprise instructions for, in response to performing the first secondary operation, displaying a sampling of data from the respective intermediate data set, corresponding to the first secondary operation, in a data pane of the user interface.

16. The computer system of claim 14, wherein the logical ordering for each secondary operation in the ordered plurality of secondary operations is determined by a chronological order in which each secondary operation is performed.

17. The computer system of claim 13, wherein each node has a primary data set computed according to the primary operation and the one or more programs further comprise instructions for:
in response to receiving a fourth user input to select the primary operation in the change list pane, displaying a sampling of data from the primary data set.

18. The computer system of claim 13, wherein each of the nodes has an untouched input data set corresponding to the data set before the primary operation or any secondary operation at the node is performed and the one or more programs further comprise instructions for:
in response to receiving a fifth user input to select the untouched input data set in the change list pane, displaying a sampling of data from the untouched input data set.

19. The computer system of claim 13, wherein each primary operation comprises a reshaping operation that is one of: aggregate, pivot, join, or union, or comprises an input or output operation.

20. The computer system of claim 13, wherein each secondary operation is one of: calculate field, rename field, remove field, edit value, group and replace, split, or change datatype.

* * * * *